US 6,536,337 B2

(12) United States Patent
Huchet et al.

(10) Patent No.: US 6,536,337 B2
(45) Date of Patent: Mar. 25, 2003

(54) BALE WRAPPING SUPPLY ROLL HANDLING ARRANGEMENT

(75) Inventors: Pierre-Philippe Huchet, L'Isle Jourdains (FR); Philippe Lucand, Melin (FR)

(73) Assignee: Deere & Company, Moline, IL (US)

( * ) Notice: Subject to any disclaimer, the term of this patent is extended or adjusted under 35 U.S.C. 154(b) by 17 days.

(21) Appl. No.: 09/864,776

(22) Filed: May 24, 2001

(65) Prior Publication Data
US 2002/0046552 A1 Apr. 25, 2002

(30) Foreign Application Priority Data
May 25, 2000 (DE) ............................ 100 26 066

(51) Int. Cl.[7] ............................ B30B 5/06; A01D 39/00
(52) U.S. Cl. ............................ 100/76; 100/88; 56/341; 53/383.3; 242/419; 242/547
(58) Field of Search ................ 56/341, 343; 53/118, 53/383.3, 389.2, 587; 100/76, 88; 242/421.2, 422.5, 547, 419, 419.1, 419.3, 419.9

(56) References Cited
U.S. PATENT DOCUMENTS

| | | | | |
|---|---|---|---|---|
| 2,553,374 A | * | 5/1951 | Kahn | 242/422.5 |
| 3,065,923 A | * | 11/1962 | Karr | 242/421.1 |
| 3,720,385 A | * | 3/1973 | Staats | 242/421.1 |
| 4,771,966 A | * | 9/1988 | Anderson | 242/422.5 |
| 4,956,968 A | * | 9/1990 | Viaud et al. | 100/88 |
| 5,365,836 A | * | 11/1994 | Campbell | 100/88 |
| 6,233,913 B1 | * | 5/2001 | Roth et al. | 56/341 |
| 6,357,349 B1 | * | 3/2002 | Tomberlin et al. | 242/419 |

* cited by examiner

Primary Examiner—W. Donald Bray

(57) ABSTRACT

A large round baler is equipped with a device for wrapping a bale formed in the baling chamber of the baler with a web of plastic sheeting or net wrapping medium. A supply roll of the wrapping medium is located in a box mounted forward of the baling chamber for movement along a fore-and-aft extending guide rail between a standby position, wherein a free end of the wrapping medium is supported by a guide surface at a location spaced forward of the baling chamber, and a wrapping position, wherein the free end of the wrapping medium is located for being grabbed by rotating rollers and/or the formed bale so that a length of the wrapping medium is pulled from the supply roll as it is wrapped about the bale. A power operated brake operates on the supply roll so as to provide a constant tension in the wrapping medium during wrapping operation.

9 Claims, 3 Drawing Sheets

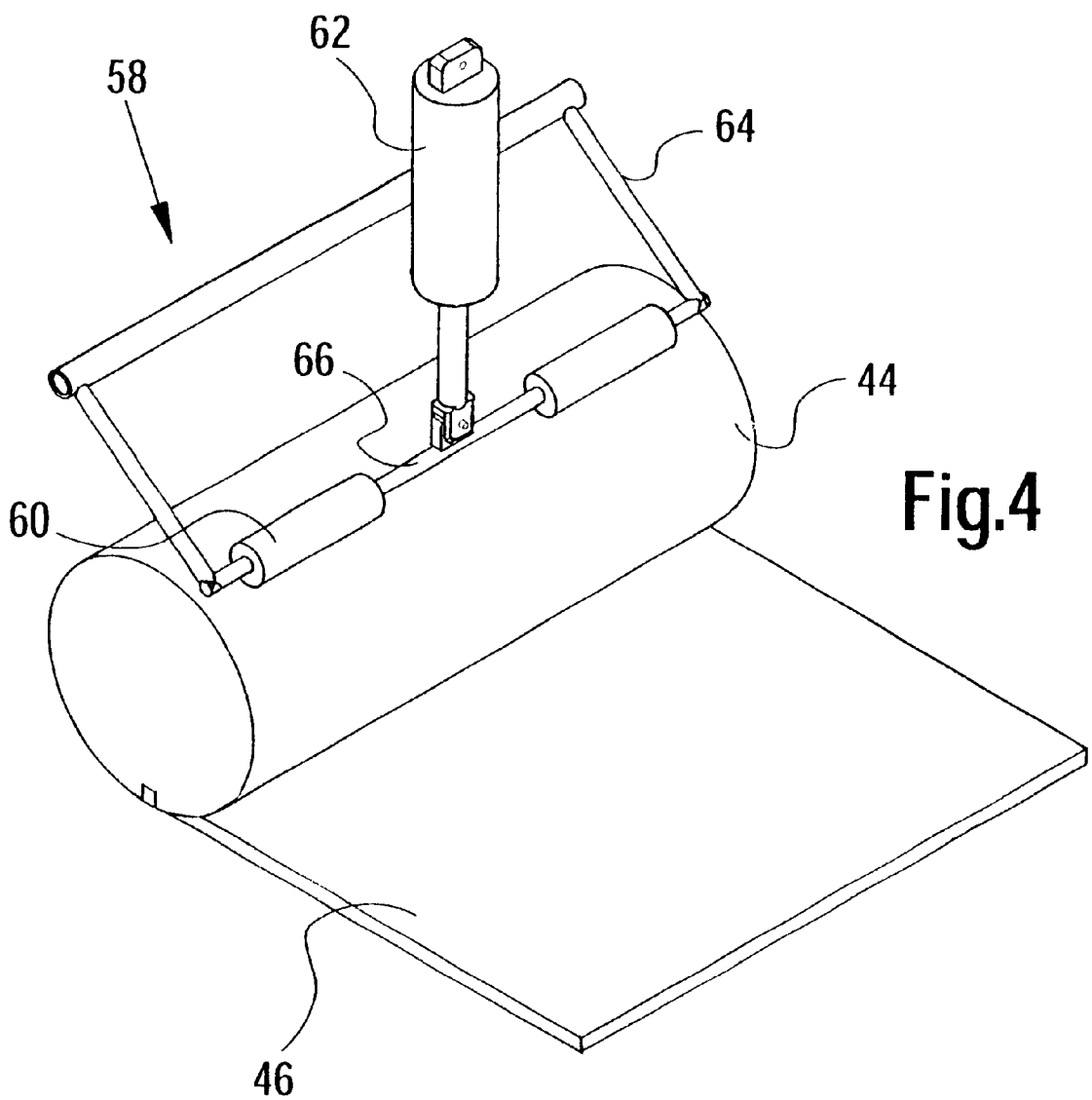

BALE WRAPPING SUPPLY ROLL HANDLING ARRANGEMENT

FIELD OF THE INVENTION

The present invention relates to a device for wrapping a round bale with a wrapping medium and more specifically relates to a device for handling a supply roll of wrapping medium

BACKGROUND OF THE INVENTION

DE-U1-82 21 610 discloses a large round baler equipped with a netting wrapping apparatus including a container for receiving a netting roll, a brake, a pair of rollers and a cutting device. The container is located on top of the round bale press and receives a supply roll of netting material, with the roll lying against the walls of the container during unwrapping. The brake includes a swiveling yoke, with a crossways-running rod that is pressed by means of a spring onto the entire circumference of the roll. The rollers run opposite one another and can be powered to pull the netting off of the roll and lead it to a baling chamber, and to tension it so that it lies taut around the bale. The wrapped length of netting can be separated from the roll by a cutting device which operates at the end of the wrapping process and works upon the taut netting.

WO-A1-9705767 discloses a large round baler with a netting or sheeting wrapping apparatus, which enables the free ends of the netting or sheeting to be brought into engagement with the harvested matter and thus to be wrapped around the bale, that has a vertically adjustable netting or sheeting wrapping apparatus. The unwound part of the netting or sheeting is separated from the roll by braking the roll or actually bringing it to a stop, so that the netting or sheeting tears off. How a possible brake could look or might be attached is not disclosed.

According to U.S. Pat. No. 4,956,968 a large round baler is equipped with a netting wrapping apparatus that brings the ends of the netting into the area between the press elements and the round bales by means of a swiveling feed arm. No brake operates on the netting roll itself.

This state of the art yields different types of brakes—those, for one, that are supposed to prevent the wrapping medium on the roll from unwinding, so that the wrapping medium does not build up, as well as those that delay movement of the wrapping medium, so that it is wrapped firmly around the bale and tears off or can be cut easily.

The problem, on which this invention is based, is perceived to be that the aforementioned brakes/rollers, and the balers equipped with them, are relatively complicated.

SUMMARY OF THE INVENTION

According to the present invention, there is provided an improved manner of handling a supply roll of bale wrapping medium on a baler equipped with a bale wrapping arrangement.

An object of the invention is to provide a wrapping arrangement for a large round baler including a motor for applying a braking force to a supply roll of wrapping medium during the time that a length of wrapping material is being pulled from the supply roll by the action of a rotating bale located in the baling chamber.

A more specific object of the invention is to provide a wrapping arrangement, as set forth in the previous object, wherein the motor is controlled so as to vary the braking force, and/or duration thereof, applied to a wrapping material supply roll in accordance with atmospheric conditions and/or control signals generated by sensors measuring the quantity of netting or sheeting pulled off the supply roll, the roll-off speed, and the like. The brake includes a contact element mounted at the end of a pivotal arm and, since the position of the arm is indicative of the roll diameter, the quantity of wrapping medium remaining on the roll is a function of arm position and this can be sensed. Also, the contact element is the form of a roller so that its rotation is indicative of the amount of wrapping material pulled off the supply roll, and this rotation can be sensed.

Another broad object of the invention is to provide a wrapping arrangement which, without the need for driven wrapping medium feed rolls, selectively places the free end of the wrapping medium in a position to be grabbed and pulled off the supply roll by the bale-forming elements and/or the formed bale.

A further specific object of the invention is to provide a wrapping arrangement wherein the container for the supply roll and a guide for the wrapping material may be selectively moved between a standby position, wherein the guide holds a free end of the wrapping medium at a location spaced from the baling chamber, and a dispensing position, wherein the free end of the wrapping medium is disposed for being grabbed by harvested matter entering the baling chamber and/or by the bale forming elements and/or the formed bale.

These and other objects of the invention will become apparent from a reading of the ensuing description together with the appended drawings.

BRIEF DESCRIPTION OF THE DRAWINGS

FIG. 4 is a perspective view showing the braking arrangement for the roll of wrapping material.

DESCRIPTION OF THE PREFERRED EMBODIMENT

Figure 1:
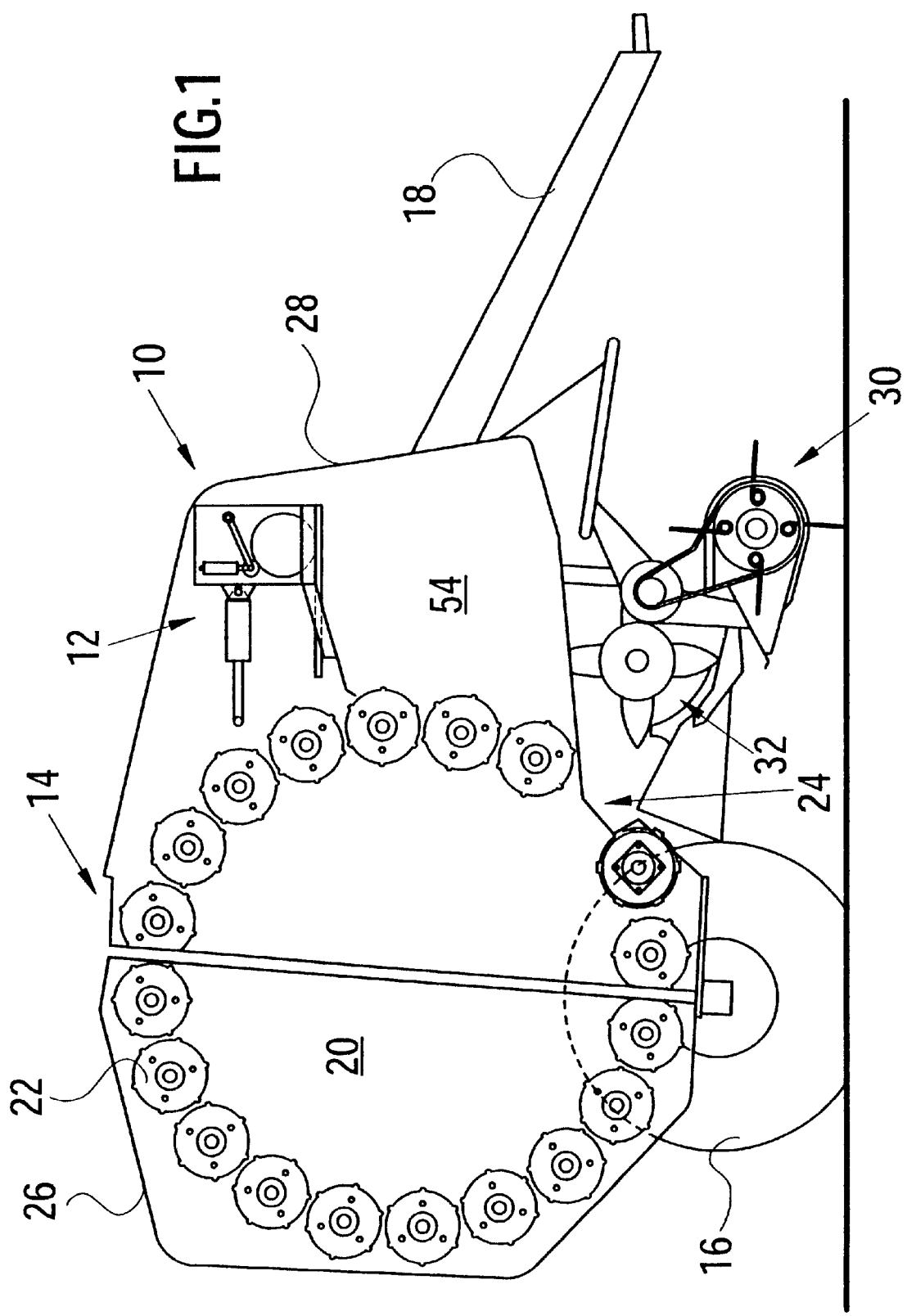
FIG. 1 is a schematic, right side view of a large round baler equipped with a mechanism for wrapping the bale with sheeting or netting material.

Referring now to FIG. 1, there is shown a large round baler 10 equipped with a wrapping device 12 for wrapping bales formed by the baler 10. The baler 10 includes a frame or chassis 14 supported on a pair of ground wheels 16 and having a tongue 18 adapted for being hitched to a tractor. A baling chamber 20 is formed by a plurality of rollers 22 arranged in a circle. A harvested matter intake 24 is located at about the five o'clock position for receiving harvested matter delivered thereto by the action of a pick-up 30 and a tined rotor which cooperates with a cutter 32. The frame 14 is subdivided into a vertical swinging rear part 26 and a front housing part 28, in each of which approximately half of the rollers 22 are located.

Figure 2:
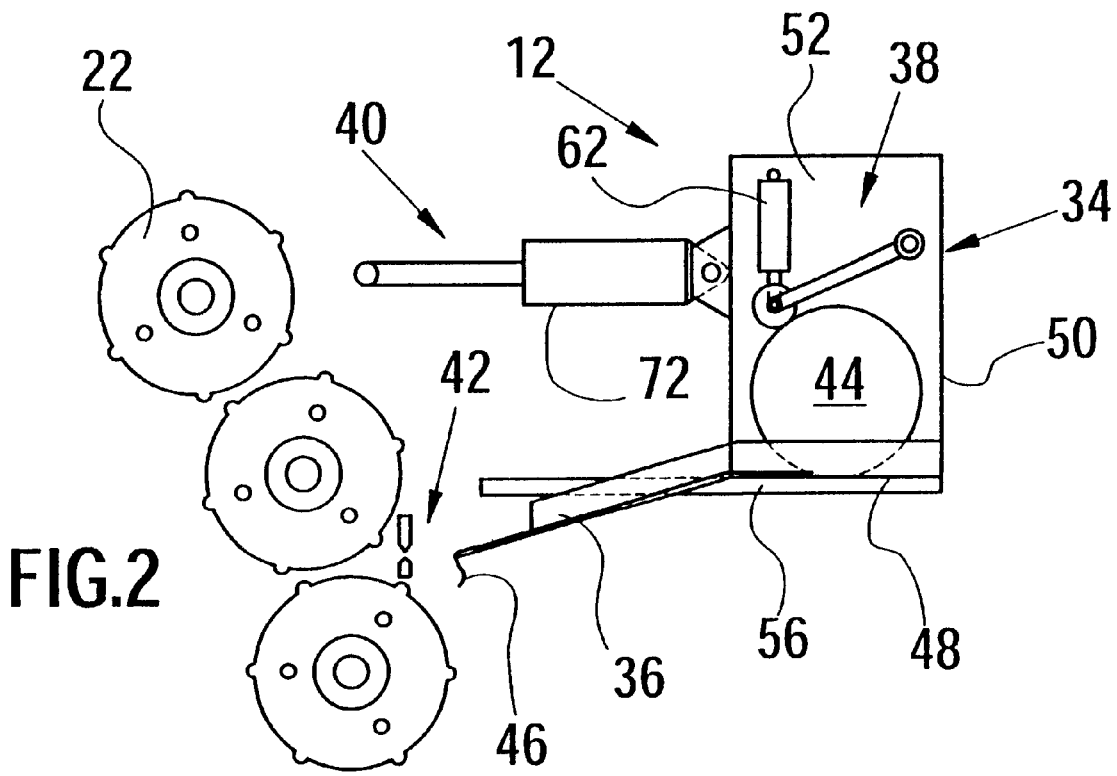
FIG. 2 is an enlarged view of the wrapping device shown located in its non-operating or standby condition.
Figure 3:
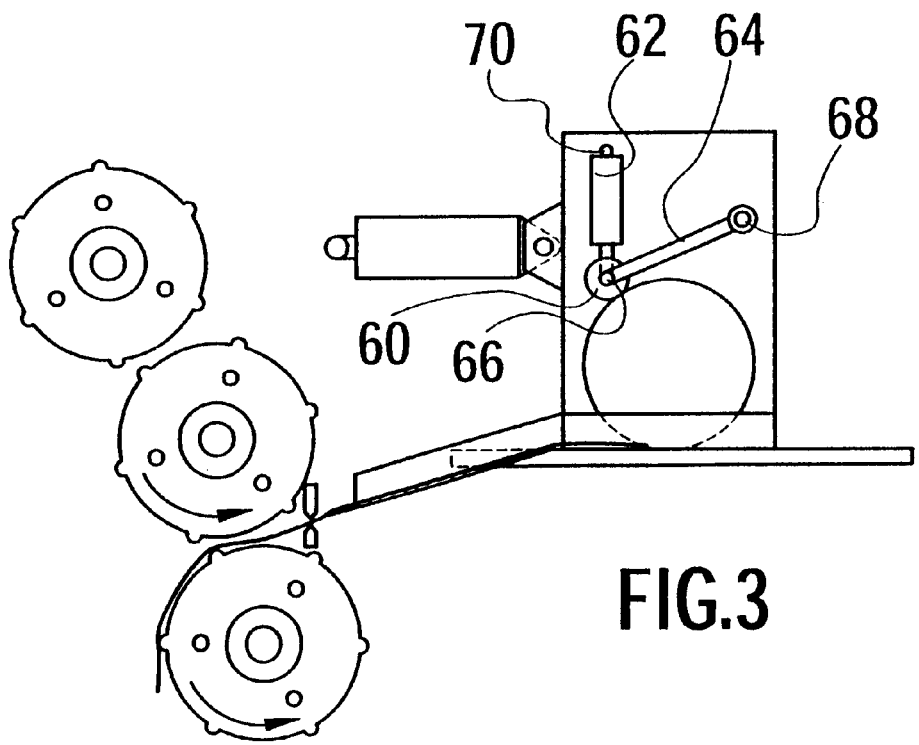
FIG. 3 is a view like FIG. 2 but showing the wrapping device in an operating or wrapping condition.

Referring now to FIGS. 2 and 3, it can be seen that the wrapping device 12 includes a housing or container 34, a guide surface 36, a brake 38, an adjusting device 40 and a cutting device 42.

The wrapping device 12 is located in the upper front area of the front housing part 28 and serves to keep available a wrapping medium supply roll 44 from which a length of wrapping medium 46 is shown extending from the bottom of the roll. The length of wrapping medium 46 is located for being conveyed into the baling chamber 20 for being wrapped around a bale formed therein. The roll 44, and hence the wrapping medium 46 advantageously extends over the entire width of the baling chamber 20, or even wider than that, if it is desired to wrap the medium over the edges of the bale ends.

The housing 34 is configured as a sheet metal box that is open in the back and on the top, and includes a floor 48, a front wall 50, and opposite side walls 52. The housing 34 extends between opposite side walls 54 of the baler front housing part 28, and is set on horizontal, fore-and-aft extending guide rails 56 that allow the housing 34 to be shifted therealong, toward and away from the baling chamber 20. The roll of wrapping medium 44 is located in the housing 34. The roll 44 is shown in a position wherein it rolls off the floor 48 and wall 50. Alternatively, the roll could be set so that it could be turned on its axle, where the axle is held fast between the side walls 52 or is moveable in the direction of the front wall 50.

Guide surface 36 is configured as a channel of sheet metal, synthetic material, bars or something similar, and extends from floor 48 toward rollers 22. The side areas of guide surface 36 are partly bent upward, to form the channel shape. The wrapping medium 46 slides along the top of guide surface 36 from the roll 44 to the end of guide surface 36, and hence to the gap between two neighboring rollers 22. A covering surface could also be provided over guide surface 36 that would prevent dirt, which hinders the wrapping medium's movement, from settling on guide surface 36.

Brake 38 is located in the housing 34 and features an adjusting device 58, a contact element 60 and a motor 62. The brake 38 has the task of holding back the movement of the wrapping medium 46, so that it is laid taut onto the entire circumference of a round bale. In addition, the tension is also kept up so that the wrapping medium 46 can be reliably cut or separated from the roll 44. Brake 38 is configured so that it continues to generate the same tension in the wrapping medium 46 despite the diminishing diameter of the roll 44. Brake 38 is connected to the housing 34 so that it moves together with it, which means that it maintains the same position with reference to the receiver 44.

As can best be seen in FIG. 4, brake 38 includes, in the embodiment example presented, a rectangle-shaped tubular frame having opposite sides defined by arms 64 having respective front ends joined to opposite ends of a tubular cross member 66, and having respective rear ends joined to opposite ends of a rear cross member having its opposite ends each mounted to a bearing 68 located in the opposite side walls 52 so as to define a horizontal, transverse pivot axis about which the frame is swingable. Provided on the cross member 66 are two contact elements 60 configured as sleeves and that are arranged so that they can be rotated, such that heat build-up between the elements 60 and the member 66 and wrapping medium 46 is avoided. Contact elements 60 are, for example, made of a wear-resistant synthetic material and are equipped with a textured surface. Contact elements 60 are each located in the side areas of the cross link 66, but a single element extending the entire length of the cross member 66 could be used as well.

An extensible and retractable motor 62 lies between a second bearing 70 on the side walls 52, or between a shaft extending between the side walls, and the cross link 66, and serves to hold the contact elements 60 in steady, although appropriately variable, contact with the entire circumference of the roll 44. Motor 62 is, in this embodiment example, configured as an extensible and retractable hydraulic cylinder. To this belongs a controlling or regulating apparatus, not shown, that can function in various ways, but which, in any case, adapts the tension of the wrapping medium 46 to meet the respective requirements. Motor 62 grasps cross member 66 at a location centered between the contact elements 60, while bearings 68, 70 and the engaging point of the motor 62 with the cross member 66 form a triangle.

Adjusting device 40 includes a servomotor 72 with a regulating system (not shown) and rails, on which the housing 34 rests. Adjusting device 40 has the task of moving the housing 34 and the guide surface 36 toward or away from the baling chamber 20, as shown in FIGS. 2 and 3. In this way, the end of guide surface 36 arrives at the gap between the rollers 22 and, with the end of the wrapping medium 46 hanging down, the wrapping medium is brought into the baling chamber 20 where it is caught between the entire circumference of the just-formed round bale and the bale-forming rollers 22, which carry the wrapping medium 46 along. FIGS. 2 and 3 indicate that the apparatus 12 is moved toward the baling chamber 20 when the wrapping process is initiated, and is moved away from it when the wrapping process ends. Instead of being guided on the rails 56, as shown, other methods could be suitable for the adjustment, for example, controlling rods, rollers and channels, etc. While the rails 56 are essentially configured horizontally in the drawing, they could be inclined or follow a defined curve. In any case, however, it is only essential that the wrapping medium 46 be reliably brought into the gap between the rollers 22 and that the guide surface 36 be able to be retracted for the separation process.

Cutting device 42 is configured in the manner of a pair of scissors, the blades of which are located on the outer portion of a wedge area located between the rollers 22. Depending on the possible adjustment methods of the apparatus 12, cutting device 42 can also be configured differently, or it can be located at a greater distance from the rollers 22. Cutting device 42 is configured so that it allows the passage of the end of the wrapping medium 46 that hags down and perhaps also at the end of guide surface 36. Cutting device 42 will be activated automatically; after the end of the wrapping process, in the course of which the wrapping medium 46 is cut so that a sufficiently long overhang is left on the end of the guide surface 36. According to an alternative embodiment, not shown, cutting device 42 has an immobile upper or lower toothed separating ridge. Wrapping medium 46 is then applied to this separating ridge and pulls the wrapping medium 46 tightly across it. This can be accomplished through appropriate guidance by means of the rails 56, which for example, would not run horizontal, but rather would inline or ascend in this case.

Summarizing, the following function is evident:

The starting point is the condition shown in FIGS. 1 and 2, in which no wrapping of a round bale occurs. The end of the wrapping medium 46, which is hanging down, does not come into engagement with, or into contact with; the round bale. Motor 62 is applied in such a way as to hold the roll 44 of wrapping medium 46 motionless in the housing 34. Servomotor 72 is in its extended condition.

To induce the wrapping process, the servomotor 72 is retracted and with it the housing 34 with the guide surface 36 is moved toward the baling chamber 20, so that the end of the wrapping medium 46, and perhaps also the free end of the guide surface 36, can enter into the gap between adjacent ones of the rollers 22. At this time, the brake 38 exerts little or no pressure. After movement is complete, as shown in FIG. 3, the end of the wrapping medium 46 lies on the round bale and is pulled into the baling chamber 20. While the wrapping medium 46 is being pulled from the roll 44, the brake 38 exerts pressure on the roll 44, so that wrapping medium 46 is put under tension. By means of sensors, which are riot shown and which track the position of the pivotable arms 64 or the compressive force of the motor 62, changes in adjusting device 58 are achieved that generate even tension in the wrapping medium 46.

As soon as the wrapping process is finished, housing 34 with guide surface 36 is retracted far enough that only wrapping medium 46 is still in the cutting device 42. Next, cutting device 42 is activated, so that the free end of the wrapping medium 46 hangs down over the end of the guide surface 36 and is ready for the start of the next wrapping process. Finally, housing 34 and guide surface 36 are moved back all the way into the position shown in FIG. 2.

Having described the preferred embodiment, it will become apparent that various modifications can be made without departing from the scope of the invention as defined in the accompanying claims.

What is claimed is:

1. In an apparatus for wrapping round bales with wrapping medium and including a brake in the form of a vertically swingable arm carrying a contact element arrangement adapted for being applied to a surface of a supply roll of wrapping medium and a loading device coupled to the swingable arm for forcing the contact element arrangement against said surface of said supply roll, the improvement comprising: said loading device being a selectively variable force-applying motor.

2. The apparatus defined in claim 1 wherein said motor is a hydraulic motor.

3. The apparatus defined in claim 1 wherein said contact element arrangement includes at least one roller.

4. The apparatus defined in claim 1 wherein said motor is located substantially vertically above said contact element arrangement.

5. The apparatus defined in claim 4 wherein said motor is extensible and retractable.

6. In a large round baler including a baling chamber defined by a plurality of bale forming rollers arranged in a substantially circular arc, and a bale wrapping arrangement mounted outside said baling chamber and including a container holding a supply roll of web-type wrapping medium, the bale wrapping arrangement being operable for selectively introducing a free end of wrapping medium between adjacent ones of said rollers for being caught and pulled into said baling chamber by the action of a bale formed in the baling chamber, the improvement comprising: a guide structure mounted in the vicinity of said container; said container being mounted to said guide structure for movement between a standby position spaced away from said baling chamber and a dispensing position located toward said baling chamber from said standby position; said container having a wrapping medium guide surface fixed thereto and projecting towards said baling chamber and located for guiding said free end of said wrapping medium between said adjacent ones of said rollers when said container is in its dispensing position; and an actuator coupled to said container for moving it between said standby and dispensing positions along a path determined by said guide structure.

7. The large round baler defined in claim 6 wherein said guide structure includes a fixed guide rail arrangement; and said container being mounted for movement along said guide rail arrangement.

8. The large round baler defined in claim 6 wherein said guide surface for the wrapping material medium is inclined downward from said container and is disposed for bringing said free end of said wrapping medium into engagement with a lower one of said adjacent bale forming rollers; and said lower one of said adjacent bale forming rollers rotating so as to carry said wrapping medium into said baling chamber.

9. The large round baler defined in claim 6 wherein said actuator is an extensible and retractable hydraulic cylinder.

* * * * *